United States Patent
Pfaller et al.

(10) Patent No.: US 10,029,784 B2
(45) Date of Patent: Jul. 24, 2018

(54) FLEXBEAM UNIT FOR A BEARINGLESS OR A HINGE- AND BEARINGLESS MULTI-BLADE ROTOR OF A ROTARY WING AIRCRAFT

(71) Applicant: AIRBUS HELICOPTERS DEUTSCHLAND GMBH, Donauwörth (DE)

(72) Inventors: Rupert Pfaller, Riemerling (DE); Martin Schulz, Hoehenkirchen (DE); Tobias Bodemann, Wittmund (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 780 days.

(21) Appl. No.: 14/599,660

(22) Filed: Jan. 19, 2015

(65) Prior Publication Data

US 2015/0203198 A1 Jul. 23, 2015

(30) Foreign Application Priority Data

Jan. 22, 2014 (EP) .................................... 14400003

(51) Int. Cl.
*B64C 27/33* (2006.01)
*B64C 27/32* (2006.01)

(52) U.S. Cl.
CPC .............. *B64C 27/33* (2013.01); *B64C 27/32* (2013.01)

(58) Field of Classification Search
CPC ....... B64C 27/35; B64C 27/48; B64C 27/327; B64C 27/33
See application file for complete search history.

(56) References Cited

U.S. PATENT DOCUMENTS

| 4,242,048 A | * | 12/1980 | McArdle ................. B64C 27/33 416/134 A |
|---|---|---|---|
| 4,352,631 A | | 10/1982 | Buchs et al. |
| 4,466,774 A | | 8/1984 | Cycon et al. |

(Continued)

FOREIGN PATENT DOCUMENTS

| CA | 2320606 | 3/2001 |
|---|---|---|
| DE | 19620427 | 6/1997 |

(Continued)

OTHER PUBLICATIONS

European Search Report for European Application No. 14400003, Completed by the European Patent Office on Jul. 23, 2014, 4 Pages.

*Primary Examiner* — Justin Seabe
(74) *Attorney, Agent, or Firm* — Brooks Kushman P.C.

(57) ABSTRACT

A flexbeam unit for a multi-blade rotor of a rotary wing aircraft, said flexbeam unit defining a predetermined number of torsion elements that are connectable with associated rotor blades, at least one torsion element comprising a flexbeam element having an associated longitudinal direction and comprising inner layers of a first fiber reinforced material that are embedded between outer layers of a second fiber reinforced material, said outer layers being composed of main plies comprising unidirectional fibers and said inner layers defining a cross section profile center in said associated longitudinal direction, said cross section profile center being composed of interconnected bias plies comprising fibers that are oriented transversely relative to said unidirectional fibers.

19 Claims, 7 Drawing Sheets

(56) References Cited

U.S. PATENT DOCUMENTS

| | | | |
|---|---|---|---|
| 4,650,401 A * | 3/1987 | Yao | B64C 27/33 |
| | | | 416/134 A |
| 5,358,381 A | 10/1994 | Covington et al. | |
| 6,004,099 A | 12/1999 | Bansemir et al. | |
| 7,226,272 B2 | 6/2007 | Becker et al. | |
| 7,296,975 B2 | 11/2007 | Denecke et al. | |
| 2006/0193727 A1 | 8/2006 | Denecke et al. | |

FOREIGN PATENT DOCUMENTS

| | | |
|---|---|---|
| EP | 0323857 | 7/1989 |
| EP | 1431176 | 6/2004 |
| EP | 2246256 | 11/2010 |
| IT | 1169792 | 6/1987 |
| JP | 6121894 | 1/1986 |
| WO | 2004085248 | 10/2004 |
| WO | 2004089745 | 10/2004 |

\* cited by examiner

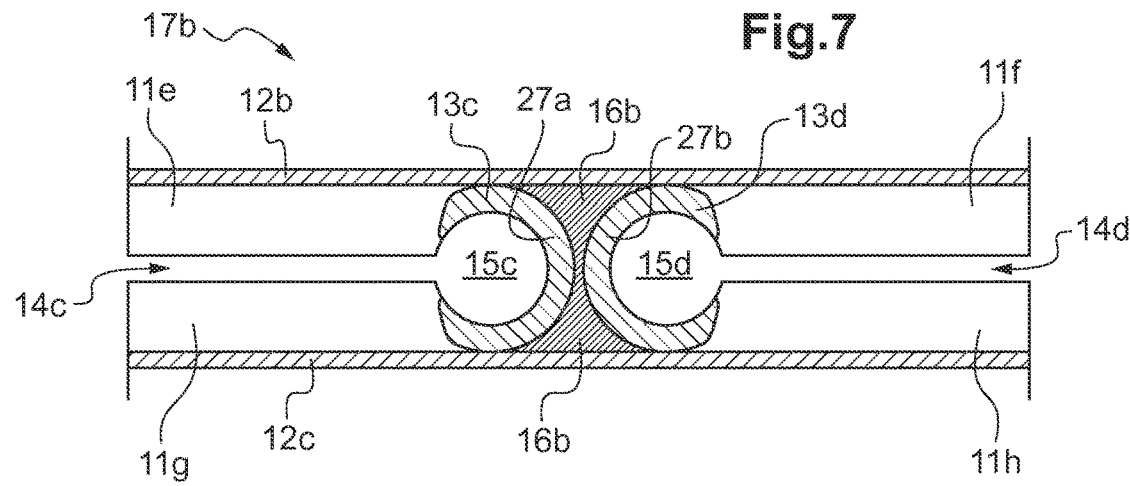
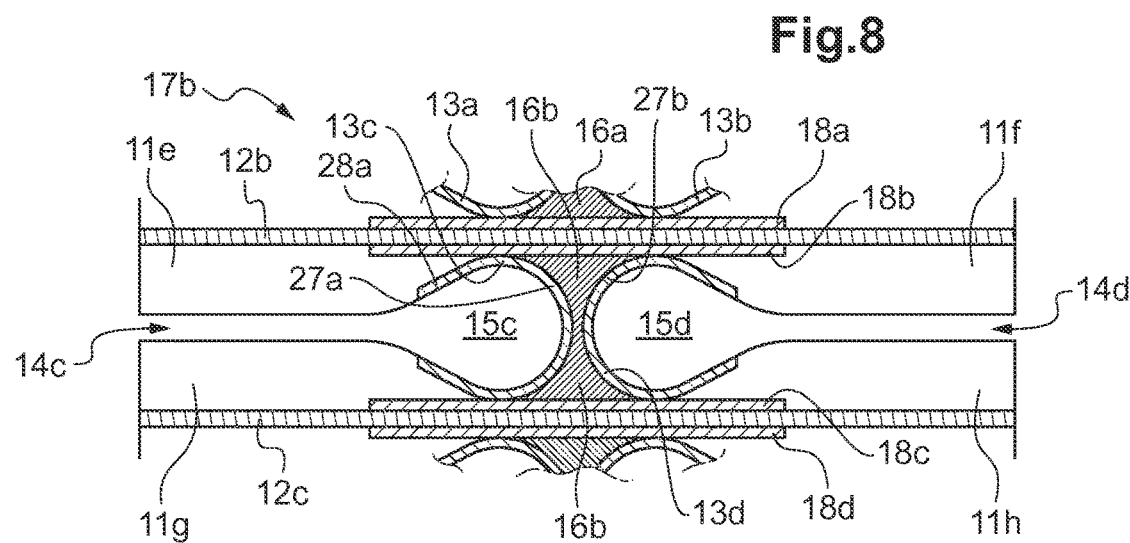
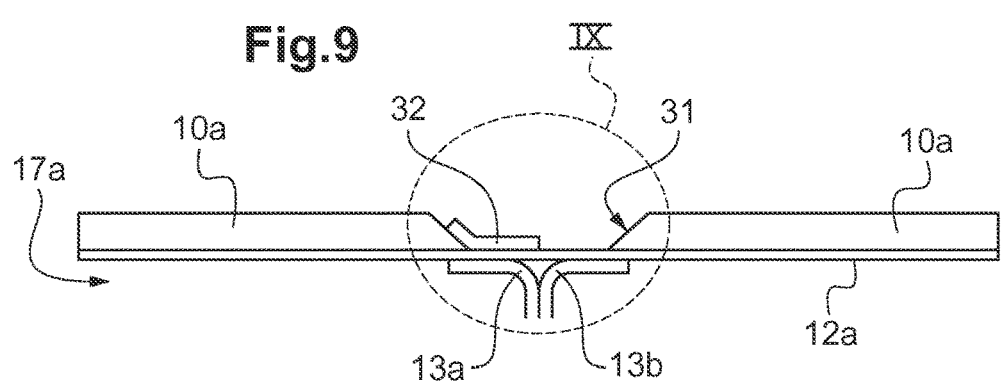

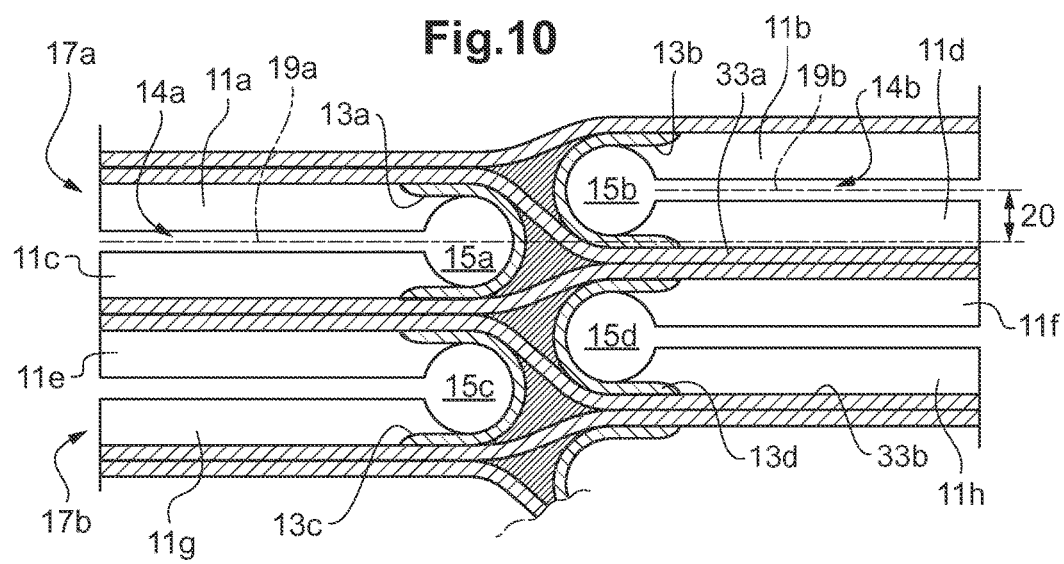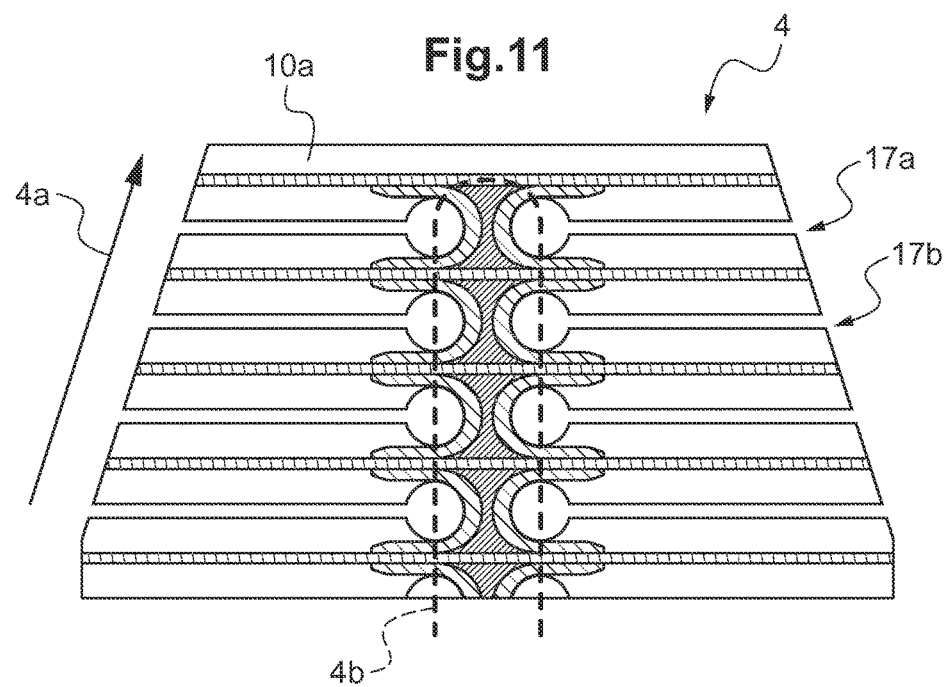

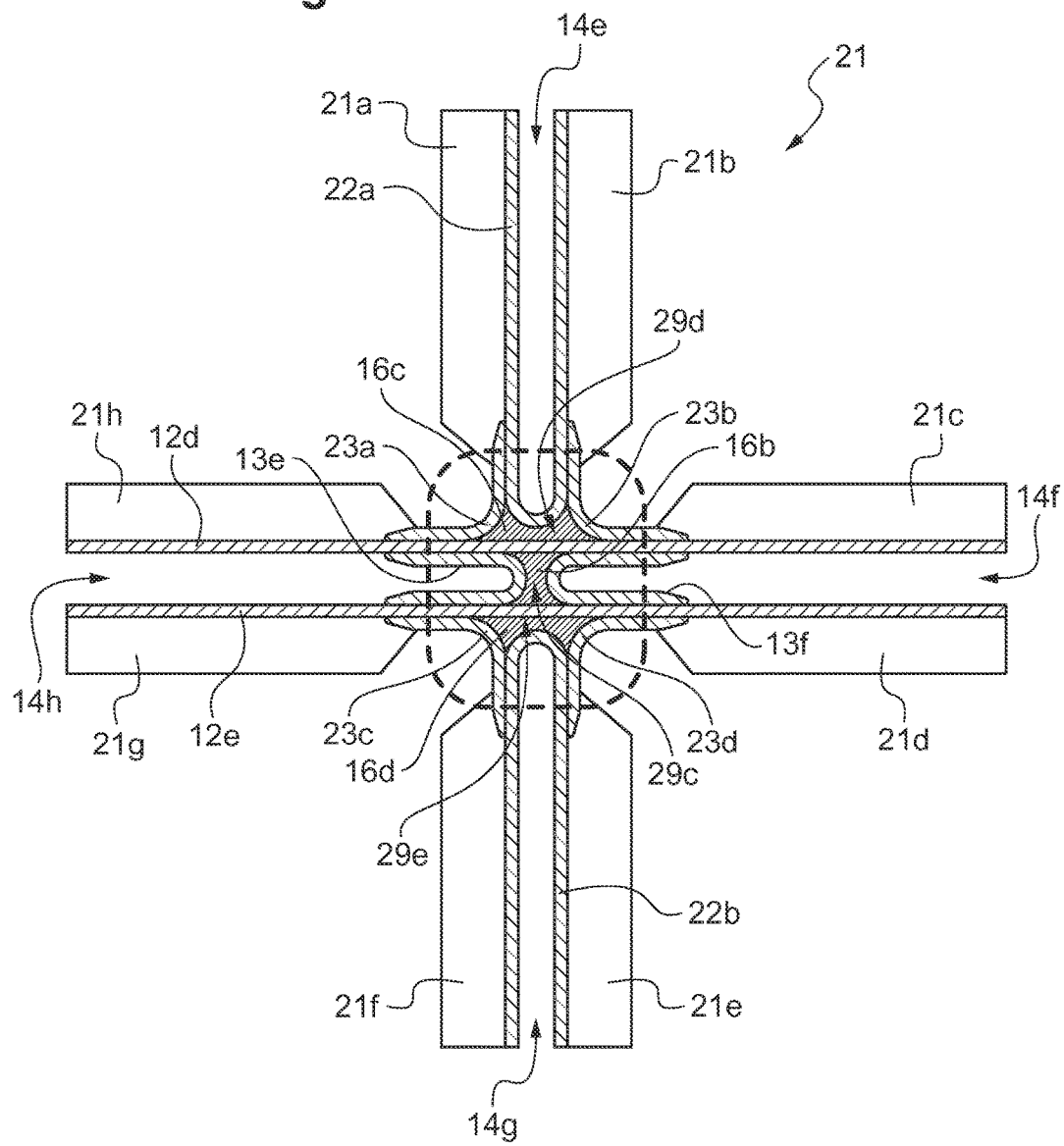

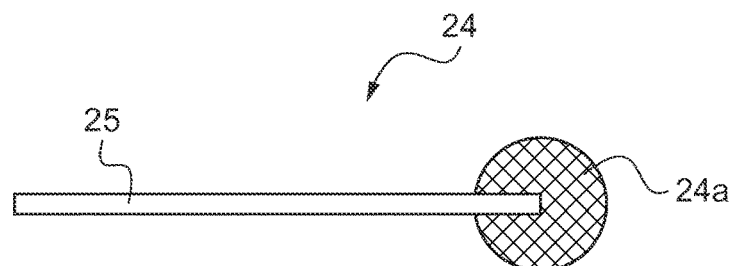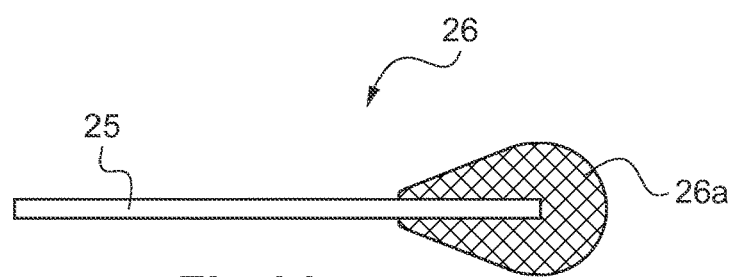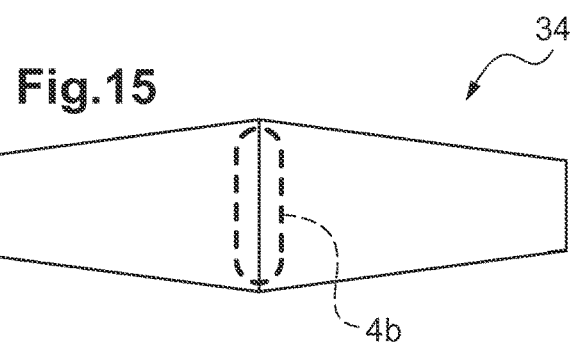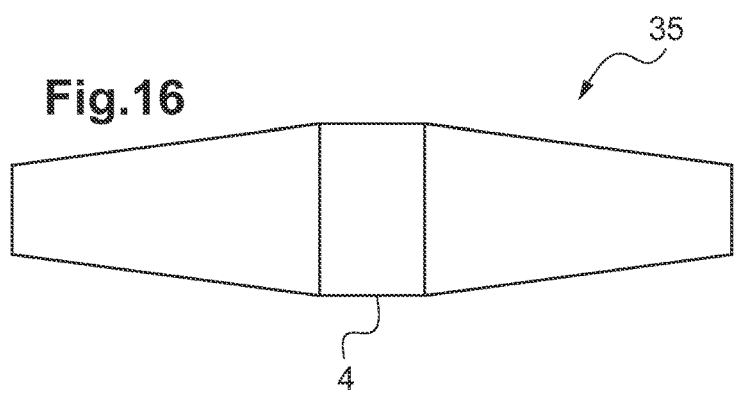

FLEXBEAM UNIT FOR A BEARINGLESS OR A HINGE- AND BEARINGLESS MULTI-BLADE ROTOR OF A ROTARY WING AIRCRAFT

CROSS REFERENCE TO RELATED APPLICATION

This application claims priority to European patent application No. EP 14 400003.1 filed on Jan. 22, 2014, the disclosure of which is incorporated in its entirety by reference herein.

BACKGROUND OF THE INVENTION (1) Field of the Invention

The invention is related to a flexbeam unit for a multi-blade rotor of a rotary wing aircraft, said flexbeam unit comprising a plurality of flexbeam elements with the features of claim 1.

(2) Description of Related Art

A flexbeam unit is used in a so-called bearingless or a so-called hinge- and bearingless rotor system to connect rotor blades of a multi-blade rotor of a rotary wing aircraft to an associated rotor shaft of the aircraft. During operation, i.e. rotation of the multi-blade rotor, the flexbeam unit must withstand and transfer tremendous centrifugal forces that the rotor blades apply thereto, while permitting their flapping, pitch and lead-lag motions. Therefore, the flexbeam unit comprises special, in particular fiber reinforced composite material flexbeam elements that are flexible enough in torsion to allow twisting for blade movement without discrete bearings in the case of a bearingless or a hinge- and bearingless rotor system.

These flexbeam elements usually possess lead-lag-soft regions that permit motions of associated rotor blades in a bearingless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a bearingless or a hinge- and bearingless rotor system. The distance between these virtual flapping hinges and the axis of the rotor shaft is referred to as the flapping hinge distance.

Moreover, only in a hinge- and bearingless rotor system, these flexbeam elements usually comprise torsion weak regions which enable low-force torsional motion of the flexbeam elements for inducing pitch angle adjustments of the rotor blades, and which allow limiting an associated length of the flexbeam elements. Such torsion weak regions must be resistant against lead-lag and flap shear forces and provide a required stiffness in lead-lag and flapping direction for dynamic reasons. Furthermore, such torsion weak regions should have a small cross section in order to reduce an associated drag of these regions.

More specifically, for controlling an associated torsion of the torsion weak regions of the flexbeam elements in order to set a current pitch or blade angle of the rotor blades, suitable control cuffs are associated with the flexbeam elements and, in particular, with the torsion weak regions. The control cuffs are connected to associated root ends of the rotor blades and associated flexbeam heads of the flexbeam elements at predetermined disconnecting points provided at the flexbeam heads of the flexbeam elements. An underlying radial position of these disconnecting points with respect to the rotor shaft of the multi-blade rotor is mainly defined by a given axial length of the control cuffs and the flexbeam elements, and is usually located at a comparatively high radial distance from the rotor shaft.

As the control cuffs cause a disturbance of an aerodynamic airflow at the multi-blade rotor, which disturbance increases with the radial distance of the disconnecting points from the rotor shaft, the given axial length of the control cuffs and their projected profile need to be reduced in order to reduce an associated aerodynamic drag. However, reducing the given axial length of the control cuffs inherently implies reducing an underlying axial length of the flexbeam elements, so that comparatively short and compact flexbeam elements can be provided which allow for a high torsion angle per length unit.

The document U.S. Pat. No. 4,352,631 describes a flexbeam element that is made of fiber compound material and that functions as a flapping hinge, a lead-lag hinge and a torsion hinge. This flexbeam element has a cruciform cross section and comprises at least two components arranged at an angle relative to each other. At least one component, which is made up of main plies comprising unidirectional fibers, extends outside the boundary of the other component on both sides of the other component, which is made up of bias plies comprising fibers that are oriented transversely relative to said unidirectional fibers. Slots are arranged in at least one of the components and these slots extend substantially towards an associated shearing center or rather towards a central shearing axis of the flexbeam element.

However, the cruciform cross section of this flexbeam element needs to be passed into flat rectangular cross sections at an associated flexbeam root and head for connection to the rotor shaft and an associated rotor blade, which makes manufacturing of this flexbeam element difficult. Furthermore, the cruciform cross section still provides for a comparatively high torsional stiffness and a peak stress in the unidirectional fibers is also comparatively high.

The document U.S. Pat. No. 5,358,381 describes a flexbeam element having a central part with radially extending flanges. Each flange comprises a bias pack that is embedded between two unidirectional belts, which in turn are surrounded on their outer surface by a thin cover. The bias pack is constructed of four plies of ±45° fiberglass material, the unidirectional belts are constructed of unidirectional fiberglass material and the thin cover consists of woven fiberglass material, i.e. of bias plies. All bias packs are intersected at an associated web defining the central part that is, thus, formed by these bias packs, while the unidirectional belts have a thickness that decreases towards said web, so that the unidirectional belts are not joined to said web. However, the bias packs that are interconnected at the web define notches at the central part. Plies with unidirectional fibers have been added in the notches at the central part in order to reduce a given corner peak stress in shear.

However, the plies with the unidirectional fibers are not appropriate to reduce shear stress occurring in the notches at the central part. Furthermore, the plies with the unidirectional fibers at the central part are not appropriate to avoid delamination at the central part. Moreover, as shear forces occurring at the flanges are low and as the flanges are subjected to the highest normal stresses, covering the plies with unidirectional fibers of the flanges with bias plies can be omitted and, thus, unnecessarily complicates manufacturing of the flexbeam element, as the bias plies are not appropriate for resistance to normal stresses and have lower strength, especially fatigue strength, as unidirectional fibers.

The document US 2006/0193727 A1 describes a flexbeam element that is made up mostly of composite fiber material. This flexbeam element has a cross section with a substantially symmetric, flattened shape that has approximately the contour of a horizontal, central section of a double cone, i.e. two cones having their base sides arranged at opposing sides of the cross section. Furthermore, the flexbeam element comprises pairs of packets with unidirectional reinforcement fiber plies that are respectively separated by slots, wherein U-shaped or loop-shaped layers with reinforcement fiber fabric plies are arranged.

However, a central part of the cross section of this flexbeam element is comparatively large and an underlying radius at an inner end of each slot is comparatively narrow. This is difficult to manufacture and leads to higher shear peak stresses at the inner, narrow radii. Furthermore, the cross section as a total is larger than necessary for a required stiffness in lead-lag and flapping direction and the overall triangular shape of the double cone is difficult to manufacture.

It should be noted that further or similar flexbeam elements are also described in the documents WO 2004/089745 A1, EP 2 246 256 A1, EP 1 431 176 A1, DE 196 20 427 C1, EP 0 323 857 A2, IT 8 322 677 D0, CA 2 320 606 A1, JP 61021894 A and WO 2004/085248 A1. However, all flexbeam elements described by the prior art documents cited above have central parts, which are considered to define the most sensible areas of the flexbeam elements, having comparatively large cross section areas, which could still be reduced, and/or central parts having only plies with unidirectional fibers in high loaded areas, where relatively high shear peak stresses occur during operation.

It is, therefore, an object of the present invention to provide a flexbeam unit for a multi-blade rotor of a rotary wing aircraft, said flexbeam unit comprising a plurality of flexbeam elements that are suitable to overcome the above described drawbacks of the prior art, and that are comparatively easy to manufacture with a reduced length and a compact structure that allows for a high torsion angle per length unit.

BRIEF SUMMARY OF THE INVENTION

This object is solved by a flexbeam unit for a multi-blade rotor of a rotary wing aircraft, said flexbeam unit comprising a plurality of flexbeam elements with the features of claim 1.

More specifically, according to the invention a flexbeam unit for a multi-blade rotor of a rotary wing aircraft comprises a plurality of flexbeam elements defining a predetermined number of torsion elements that are connectable with associated rotor blades of said multi-blade rotor. At least one of said predetermined number of torsion elements comprises at least one flexbeam element having an associated longitudinal direction, said at least one flexbeam element comprising a plurality of inner layers of a first fiber reinforced material that are embedded between at least two outer layers of a second fiber reinforced material.

Said at least two outer layers are composed of main plies comprising unidirectional fibers and said plurality of inner layers defines a cross section profile center in said associated longitudinal direction of said at least one flexbeam element, said cross section profile center being at least substantially composed of interconnected bias plies comprising fibers that are oriented transversely relative to said unidirectional fibers. At least one of said plurality of inner layers comprises at least two curved bias plies that are embedded between at least two substantially plane bias plies and connected with said plane bias plies, said curved bias plies defining associated cavities and having curved sections.

It should be noted that in the context of the present invention the term "torsion element" refers to an element which is torsion elastic and flexible in order to allow for backward and forward lead-lag motions, flapping movements and pitch angle control movements of an associated rotor blade of the multi-blade rotor. Furthermore, these torsion elements are preferably comparatively short, thereby allowing for a rotor blade transition that is comparatively close to a rotor shaft of the multi-blade rotor for aerodynamic reasons.

Preferably, the cross section profile center is realized as weak as possible in torsion, but with good resistance against shear forces. The cross section profile center is also preferably as compact or small as possible and easy to manufacture, with only comparatively small geometry changes with respect to associated cross section geometries of flexbeam root and flexbeam head of the flexbeam element.

Advantageously, the cross section profile center is minimized in its overall dimensions and consists mainly from bias plies, except the outer layers. A volume enclosed by these bias plies is also minimized and only defined by an underlying radius of the bias plies fibers.

Due to the preferred realization of the cross section profile center, i.e. such that it is as weak as possible in torsion, loads occurring in torsional motion thereof are reduced, so that a given axial length of the flexbeam element can be reduced and an actuation force required to induce torsional motion can also be reduced. More specifically, a shear force resulting from the torsional motion is normally calculated by a given moment in torsion that is transferred by the rotor blade. But as the torsion element defined by the flexbeam element is a kind of a bearing, the main design goal is not the transferred moment in torsion, which has to be withstand by the control cuff in a hinge- and bearingless multi-blade rotor and not by the flexbeam element, but a certain deflection that has to be provided. Therefore, if the flexbeam element and, thus, the torsion element is as weak as possible in torsion, a given torsion load is low, as only a constant pitch angle in torsion is required.

Furthermore, due to the compactness of the cross section profile center of the flexbeam elements according to the present invention, its overall dimensions and its axial length are at least reduced with respect to cross section profile centers of conventional flexbeam elements. Furthermore, the cross section profile center, which is usually high loaded in shear force, consists preferably at least substantially of bias plies comprising +/−45° plies made of GFR (glass fiber reinforced fibers) or CFR (carbon fiber reinforced fibers). In this manner, the cross section profile center of the flexbeam element can be embodied in order to comprise an inner core section, which is minimized in thickness and comprises an outer shape that is made completely out of bias plies in a way that there is no unidirectional fiber as an outer limitation of this inner core section, wherein associated dimensions of the inner core section are only limited by a minimum radius required for fiber material implementing the bias plies. Thereby, the inner core section may leave a comparatively small blank space inside the cross section profile center that can be filled with other material than bias plies, such as foam, resin, short fibers and/or oriented fibers, or even with unidirectional fibers.

Moreover, reducing the axial length of the flexbeam element advantageously allows for implementing a torsion element with equally reduced axial length and, thus, a control cuff with at least substantially equally reduced axial length. Accordingly, associated disconnecting points where the control cuff is connected to an associated root end of an associated rotor blade and an associated flexbeam head of the flexbeam element can be positioned closer to the rotor shaft of the multi-blade rotor, thereby improving aerodynamic performances of the multi-blade rotor. Furthermore, a given profile of an enveloping cuff of the control cuff can be reduced and, thus, designed more compactly, which further improves the aerodynamic performances of the multi-blade rotor.

According to a preferred embodiment, said first and second fiber reinforced materials comprise glass fiber reinforced material and/or carbon fiber reinforced material.

According to a further preferred embodiment, said first and second fiber reinforced materials are identical.

According to a further preferred embodiment, said cross section profile center is adapted to define a torsion weak and shear force resistant area of said at least one flexbeam element.

According to a further preferred embodiment, said interconnected bias plies comprise fibers that are oriented in an angle of at least approximately ±45° relative to said unidirectional fibers of said main plies.

According to a further preferred embodiment, said unidirectional fibers are at least substantially arranged along said associated longitudinal direction of said at least one flexbeam element.

According to a further preferred embodiment, said curved bias plies comprise straight sections extending from said curved sections, wherein said at least one of said plurality of inner layers comprises at least four main plies that are arranged in the form of axial extensions of said straight sections of said curved bias plies between said plane bias plies.

According to a further preferred embodiment, two first main plies of said at least four main plies are associated with said straight sections of a first curved bias ply of said curved bias plies, said two first main plies being separated by a first slot and confining said associated cavity defined by said first curved bias ply.

According to a further preferred embodiment, said first slot has a thickness comprised in a range from 0.1 mm to 10 mm.

According to a further preferred embodiment, two second main plies of said at least four main plies are associated with said straight sections of a second curved bias ply of said curved bias plies, said two second main plies being separated by a second slot and confining said associated cavity defined by said second curved bias ply, wherein said first and second slots are in parallel offset with a predetermined offset distance.

According to a further preferred embodiment, said at least two curved bias plies define with said at least two substantially plane bias plies layer cavities that are filled with associated fill material.

According to a further preferred embodiment, said fill material comprises unidirectional fibers, short fibers, oriented fibers, resin and/or foam.

According to a further preferred embodiment, said curved bias plies define a U-shaped, bulb-shaped, clip collar-like shaped or circle sector shaped cross section.

According to a further preferred embodiment, said curved sections are interconnected.

According to a further preferred embodiment, said curved sections are spaced from one another.

According to a further preferred embodiment, said at least two curved bias plies are embedded between at least two intermediate, substantially plane bias plies, each of said at least two intermediate bias plies being connected with one of said at least two substantially plane bias plies, wherein said at least two curved bias plies and said at least two intermediate bias plies are embedded between said at least two substantially plane bias plies such that said at least two curved bias plies are connected with said at least two substantially plane bias plies by means of said at least two intermediate bias plies.

According to a further preferred embodiment, said at least two intermediate bias plies comprise smaller dimensions than said at least two substantially plane bias plies.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 7 shows the inner layer of FIG. 3 according to a fifth embodiment, FIG. 8 shows the inner layer of FIG. 3 according to a sixth embodiment, FIG. 9 shows a cross section of an outer layer of the selected flexbeam element of FIG. 2 according to a seventh embodiment, FIG. 10 shows two inner layers of the plurality of layers of FIG. 2 according to an eighth embodiment, FIG. 11 shows a cross section view of the selected flexbeam element of FIG. 2 with the plurality of layers of FIG. 2, FIG. 12 shows a cross section of a flexbeam element with a plurality of layers according to a ninth embodiment, FIG. 13 shows a cross section of a manufacturing component for the inner layers of FIG. 3, FIG. 6, FIG. 7 and FIG. 10, FIG. 14 shows a cross section of a manufacturing component for the inner layers of FIG. 4, FIG. 5 and FIG. 8, FIG. 15 shows a side view of the selected flexbeam element of FIG. 2, and FIG. 16 shows a side view of the selected flexbeam element of FIG. 2.

DETAILED DESCRIPTION OF THE INVENTION

Figure 1:
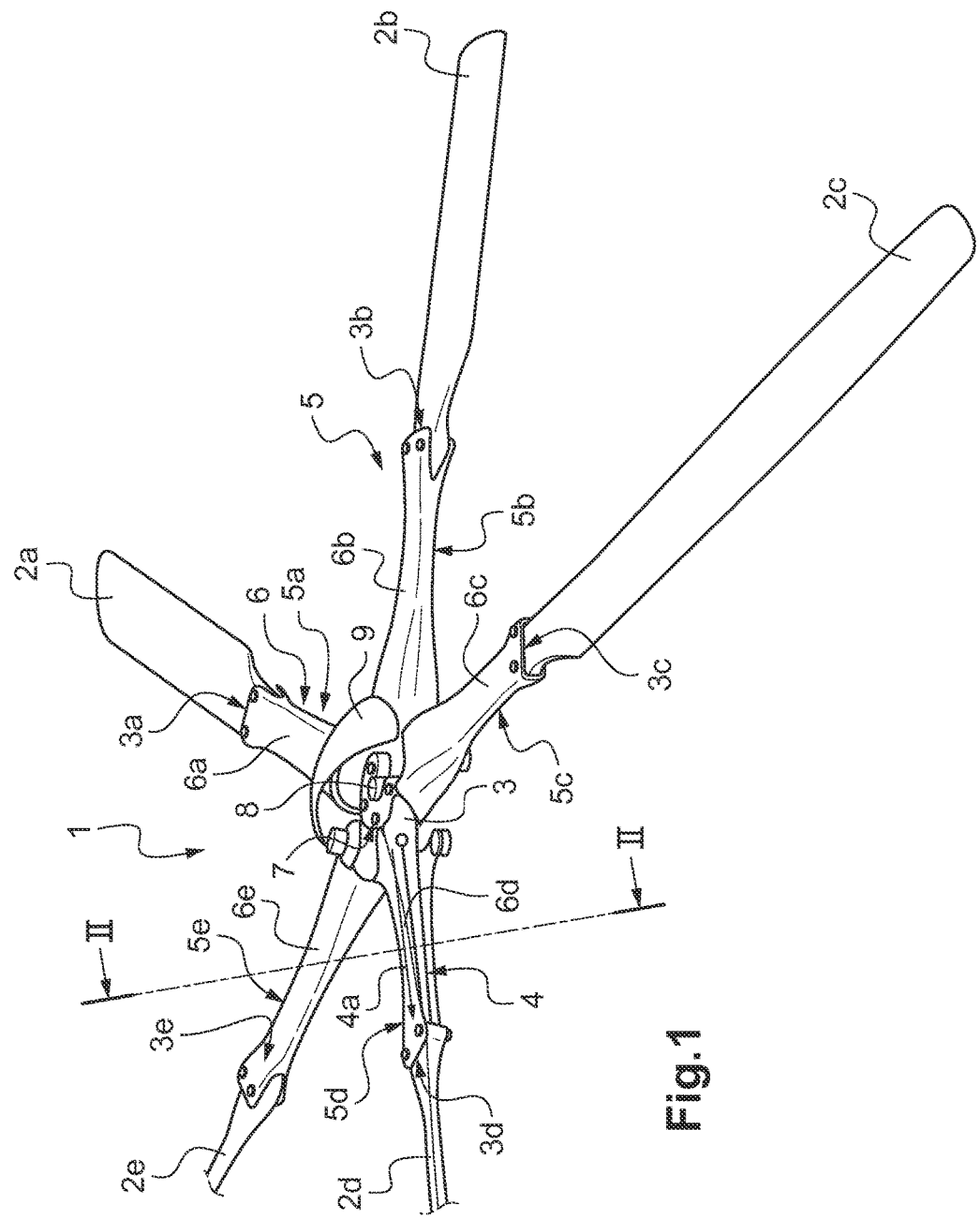
FIG. 1 shows a perspective view of a multi-blade rotor having a flexbeam unit with a plurality of flexbeam elements according to the invention.

FIG. 1 shows a multi-blade rotor 1 of a rotary wing aircraft, in particular a multi-blade rotor for a main rotor of a helicopter. The multi-blade rotor 1 illustratively comprises a rotor shaft 8 that is embodied with a rotor hub 7. Furthermore, a rotor head covering cap 9 is provided for covering a central portion of the multi-blade rotor 1 which comprises the rotor hub 7. For clarity of the drawings, this rotor head covering cap 9 is partially cut away in order to permit amongst others the illustration of the rotor hub 7.

The multi-blade rotor 1 is preferably embodied as hinge- and bearingless rotor having a flexbeam unit 3 as interface between the rotor shaft 8, i.e. the rotor hub 7, and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings.

The flexbeam unit 3 is preferably attached in a suitable manner to the rotor hub 7 and comprises a plurality of flexbeam elements defining a plurality 5 of torsion elements. It should, however, be noted that for simplicity and clarity of the drawings only a single flexbeam element of the plurality of flexbeam elements is designated with the reference number 4 and described representatively hereinafter for all flexbeam elements of the plurality of flexbeam elements, which are preferably at least similarly embodied. The flexbeam element 4 defines a longitudinal direction 4a directed from the rotor shaft 8 to its associated disconnecting points, i.e. the disconnecting points 3d.

More specifically, the plurality of flexbeam elements defines a predetermined number of torsion elements 5a, 5b, 5c, 5d, 5e of the multi-blade rotor 1, such that each one of the torsion elements 5a, 5b, 5c, 5d, 5e is associated with a given rotor blade of the plurality of rotor blades 2a, 2b, 2c, 2d, 2e. Furthermore, each one of the torsion elements 5a, 5b, 5c, 5d, 5e preferably comprises associated disconnecting points 3a, 3b, 3c, 3d, 3e for connection to an associated one of the rotor blades 2a, 2b, 2c, 2d, 2e.

Each one of the torsion elements 5a, 5b, 5c, 5d, 5e is further associated with a control cuff of a plurality 6 of control cuffs 6a, 6b, 6c, 6d, 6e. These control cuffs 6a, 6b, 6c, 6d, 6e are adapted for setting in operation of the multi-blade rotor 1 a current pitch or blade angle of the rotor blades 2a, 2b, 2c, 2d, 2e by controlling a current torsion of the torsion elements 5a, 5b, 5c, 5d, 5e, i.e. of the plurality of flexbeam elements. By way of example, the control cuff 6d is driveable for setting the current pitch or blade angle of the rotor blade 2d by controlling the current torsion of the torsion element 5d, i.e. the current torsion of the flexbeam element 4.

Figure 2:
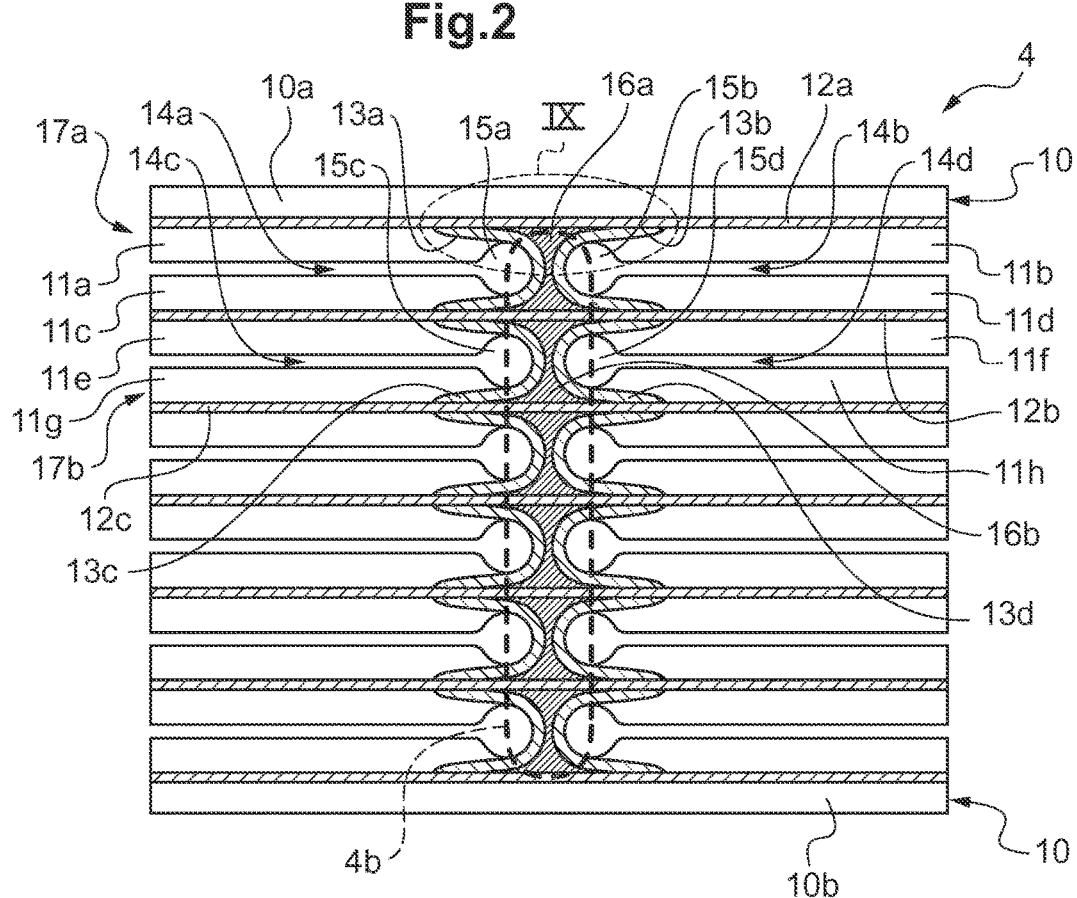
FIG. 2 shows a cross section of a selected flexbeam element of FIG. 1 with a plurality of layers.

FIG. 2 shows the flexbeam element 4 with the associated longitudinal direction 4a of FIG. 1, which illustratively comprises a rectangular cross section and which is preferably embodied with fiber reinforced materials comprising glass fiber reinforced material (GFR) and/or carbon fiber reinforced material (CFR). The flexbeam element 4 is preferably composed of a plurality of inner layers that are embedded between at least two outer layers 10. However, for simplicity and clarity of the drawings, only two inner layers are explicitly designated with the reference numbers 17a, 17b and described representatively hereinafter for all inner layers of the plurality of inner layers, which are preferably at least similarly embodied.

The inner layers 17a, 17b and the at least two outer layers 10 are preferably embodied with an identical fiber reinforced material, i.e. either with GFR or with CFR. Alternatively, the inner layers 17a, 17b are composed of a first fiber reinforced material and the at least two outer layers 10 are composed of a second fiber reinforced material that differs from the first fiber reinforced material.

The at least two outer layers 10 are preferably composed of main plies 10a, 10b that comprise unidirectional fibers. These unidirectional fibers are at least substantially arranged along the associated longitudinal direction 4a of the flexbeam element 4.

The inner layers 17a, 17b are preferably at least substantially composed of bias plies 12a, 12b, 12c, 13a, 13b, 13c, 13d, i.e. plies that comprise fibers that are oriented transversely relative to the unidirectional fibers of the main plies 10a, 10b. Preferably, the inner layers 17a, 17b define a cross section profile center 4b in the associated longitudinal direction 4a of the flexbeam element 4, which is adapted to define a torsion weak and shear force resistant area of the flexbeam element 4, and which can at least partially be filled with appropriate fill material 16a, 16b, such as short fibers, oriented fibers, resin and/or foam, or even with unidirectional fibers, as described below with reference to FIG. 3.

More specifically, the cross section profile center 4b should be embodied at least as small as possible, but preferably also as weak as possible in torsion. Therefore, the bias plies 12a, 12b, 12c, 13a, 13b, 13c, 13d composing the cross section profile center 4b are preferably interconnected and comprise fibers that are oriented in an angle of at least approximately ±45° relative to the unidirectional fibers of the main plies 10a, 10b of the at least two outer layers 10.

Preferentially, at least one of the inner layers 17a, 17b, and preferably each one of the inner layers 17a, 17b, comprises at least two comparatively short curved bias plies that are embedded between at least two substantially plane bias plies and connected with said plane bias plies, as described below with reference to FIG. 3. Illustratively, the inner layer 17a comprises two curved bias plies 13a, 13b that are embedded between two exemplarily plane bias plies 12a, 12b. The inner layer 17b illustratively comprises two curved bias plies 13c, 13d that are embedded between the plane bias ply 12b and another exemplarily plane bias ply 12c.

Furthermore, at least one of the inner layers 17a, 17b and, preferably each one of the inner layers 17a, 17b, comprises inner main plies having unidirectional fibers that are, preferentially, also at least substantially arranged along the associated longitudinal direction 4a of the flexbeam element 4. More specifically, each one of the inner layers 17a, 17b preferably comprises four such inner main plies. These inner main plies are connected with associated curved bias plies and laterally arranged in an associated one of the inner layers 17a, 17b for forming axial extensions of the associated curved bias plies within the associated one of the inner layers 17a, 17b, while being separated respectively by associated slots.

Illustratively, the inner layer 17a comprises two first lateral inner main plies 11a, 11c that are connected with the curved bias ply 13a and separated by an associated first slot 14a, and two second lateral inner main plies 11b, 11d that are connected with the curved bias ply 13b and separated by an associated second slot 14b. The slots 14a, 14b are preferably arranged coaxially. The inner layer 17b illustratively comprises two first lateral inner main plies 11e, 11g that are connected with the curved bias ply 13c and separated by an associated first slot 14c, and two second lateral inner main plies 11f, 11h that are connected with the curved bias ply 13d and separated by an associated second slot 14d. The slots 14c, 14d are also preferably arranged coaxially.

The curved bias plies 13a, 13b, 13c, 13d are adapted to define associated cavities 15a, 15b, 15c, 15d within the associated inner layers 17a, 17b. The associated cavities 15a, 15b, 15c, 15d preferably have a geometrical form that essentially depends on an underlying geometrical form of the curved bias plies 13a, 13b, 13c, 13d, but also on an underlying geometrical form of the lateral inner main plies 11a, 11b, 11c, 11d, 11e, 11f, 11g, 11h in the vicinity of the curved bias plies 13a, 13b, 13c, 13d, as explained below with reference to FIGS. 3 to 8.

Figure 3:
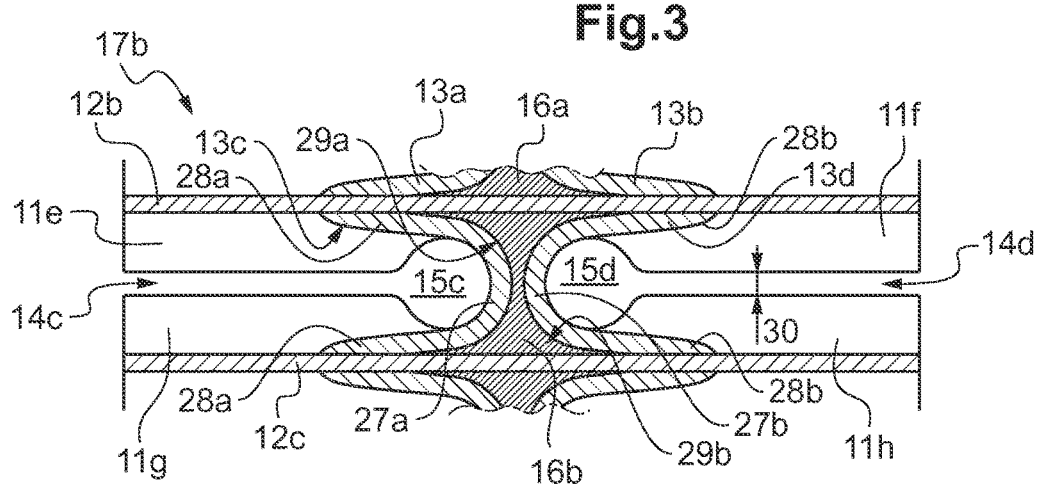
FIG. 3 shows a single inner layer of the plurality of layers of FIG. 2 according to a first embodiment.

FIG. 3 shows representatively for all inner layers of the flexbeam element 4 of FIG. 2 the inner layer 17b of FIG. 2, with the curved bias plies 13c, 13d that are embedded between the plane bias plies 12b, 12c. By way of example, the curved bias plies 13c, 13d define with the plane bias plies 12b, 12c layer cavities 29a, 29b that are filled with the associated fill material 16b of FIG. 2.

The curved bias plies 13c, 13d of the inner layer 17b are illustratively at least substantially U-shaped in cross section and define with the lateral inner main plies 11e, 11g, 11f, 11h of the inner layer 17b the cavities 15c, 15d of FIG. 2, which are exemplarily circular in cross section. More specifically, the curved bias plies 13c, 13d that are at least substantially U-shaped in cross section preferably comprise curved sections 27a, 27b and straight sections 28a, 28b that are laterally extending from said curved sections 27a, 27b. The curved sections 27a, 27b of the bias plies 13c, 13d are preferably interconnected, but may alternatively also be spaced from one another, and the straight sections 28a, 28b are preferably connected with the plane bias plies 12b, 12c, thus defining the layer cavities 29a, 29b.

Furthermore, the straight sections 28a, 28b are laterally continued by the associated lateral inner main plies 11e, 11g, 11f, 11h that are arranged in the form of axial extensions of the straight sections 28a, 28b of the curved bias plies 13c, 13d between the plane bias plies 12b, 12c. By way of example, the inner main plies 11f, 11h form axial extensions of the straight sections 28b of the curved bias ply 13d and confine, thus, the cavity 15d of FIG. 2 together with this curved bias ply 13d.

As already mentioned above with reference to FIG. 2, the inner main plies 11f, 11h are separated by the slot 14d of FIG. 2. This slot 14d preferably comprises a thickness 30 included in a range from 0.1 mm to 10 mm. All other slots 14a, 14b, 14c preferably equally comprise this thickness 30. However, the slots 14a, 14b, 14c may alternatively also comprise differing thicknesses.

Figure 4:
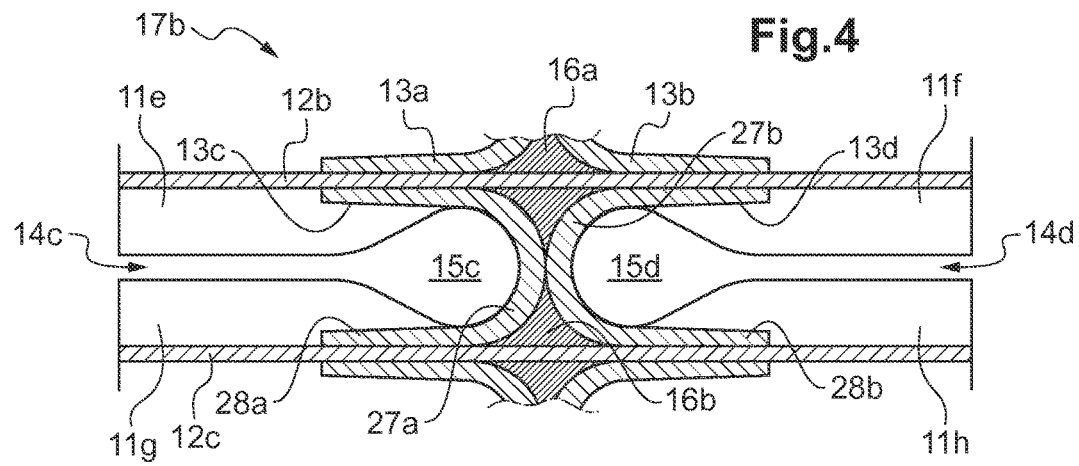
FIG. 4 shows the inner layer of FIG. 3 according to a second embodiment.

FIG. 4 shows representatively for all inner layers of the flexbeam element 4 of FIG. 2 the inner layer 17b of FIG. 2, which is now embodied according to a first variation. As mentioned above with reference to FIG. 3, the curved bias plies 13c, 13d of the inner layer 17b, which are again at least substantially U-shaped in cross section, define with the lateral inner main plies 11e, 11g, 11f, 11h of the inner layer 17b the cavities 15c, 15d. However, in contrast to FIG. 3 these cavities 15c, 15d are now illustratively bulb- or pear-shaped in cross section according to the first variation, as a result of a modification in the shape of the lateral inner main plies 11e, 11g, 11f, 11h in the vicinity of the cavities 15c, 15d.

Figure 5:
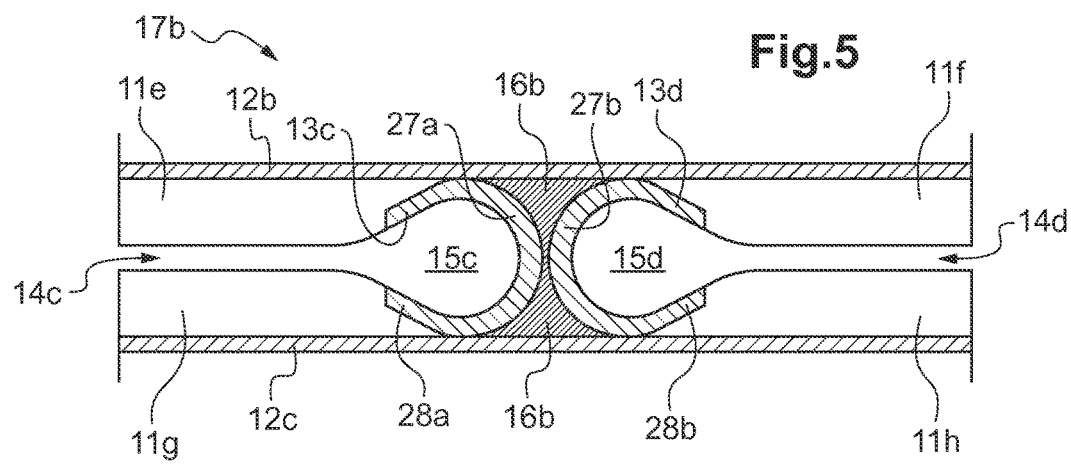
FIG. 5 shows the inner layer of FIG. 3 according to a third embodiment.

FIG. 5 shows representatively for all inner layers of the flexbeam element 4 of FIG. 2 the inner layer 17b of FIG. 2, which is now embodied according to a second variation. As mentioned above with reference to FIG. 4, the curved bias plies 13c, 13d of the inner layer 17b define with the lateral inner main plies 11e, 11g, 11f, 11h of the inner layer 17b the cavities 15c, 15d, which are again bulb- or pear-shaped in cross section. However, in contrast to FIG. 4 the curved bias plies 13c, 13d themselves are now illustratively bulb- or pear-shaped in cross section according to the second variation.

Figure 6:
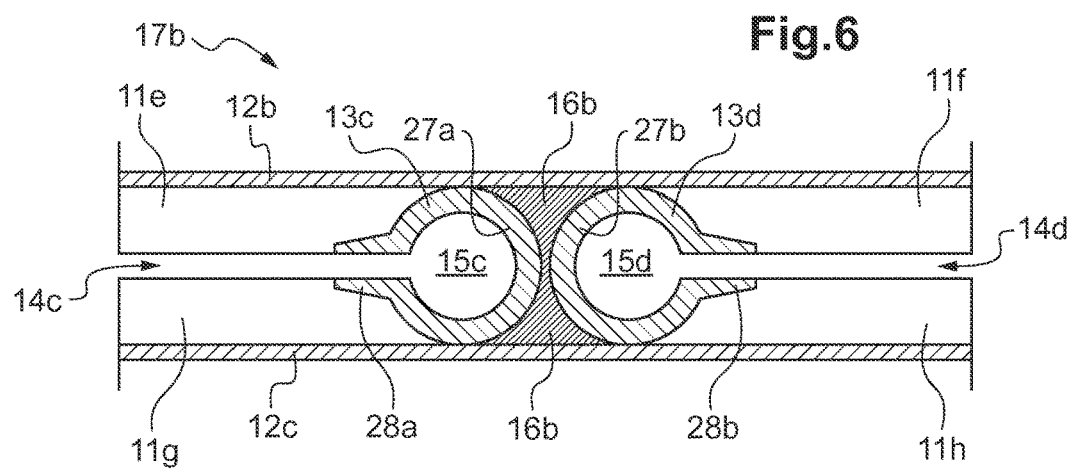
FIG. 6 shows the inner layer of FIG. 3 according to a fourth embodiment.

FIG. 6 shows representatively for all inner layers of the flexbeam element 4 of FIG. 2 the inner layer 17b of FIG. 2, which is now embodied according to a third variation. As mentioned above with reference to FIG. 3, the curved bias plies 13c, 13d of the inner layer 17b define with the lateral inner main plies 11e, 11g, 11f, 11h of the inner layer 17b the cavities 15c, 15d, which are again circular in cross section. However, in contrast to FIG. 3, the curved bias plies 13c, 13d themselves are now illustratively clip collar-like shaped in cross section according to the third variation, with the shape of the lateral inner main plies 11e, 11g, 11f, 11h in the vicinity of the cavities 15c, 15d being adapted accordingly.

FIG. 7 shows representatively for all inner layers of the flexbeam element 4 of FIG. 2 the inner layer 17b of FIG. 2, which is now embodied according to a fourth variation. As mentioned above with reference to FIG. 6, the curved bias plies 13c, 13d of the inner layer 17b define with the lateral inner main plies 11e, 11g, 11f, 11h of the inner layer 17b the cavities 15c, 15d, which are again circular in cross section. However, in contrast to FIG. 6, the curved bias plies 13c, 13d themselves now comprise a circle sector shaped cross section according to the fourth variation, with the shape of the lateral inner main plies 11e, 11g, 11f, 11h in the vicinity of the cavities 15c, 15d being adapted accordingly.

FIG. 8 shows representatively for all inner layers of the flexbeam element 4 of FIG. 2 the inner layer 17b of FIG. 2, which is now embodied according to a fifth variation. As mentioned above with reference to FIG. 5, the curved bias plies 13c, 13d of the inner layer 17b, which are bulb- or pear-shaped in cross section, define with the lateral inner main plies 11e, 11g, 11f, 11h of the inner layer 17b the cavities 15c, 15d, which are also bulb- or pear-shaped in cross section.

However, in contrast to FIG. 5, the curved bias plies 13c, 13d are now embedded between at least two intermediate bias plies 18b, 18c, which are at least substantially plane. Preferably, the curved bias plies 13c, 13d are connected with these intermediate bias plies 18b, 18c. Furthermore, the curved bias plies 13c, 13d are illustratively spaced from one another, but may alternatively also be interconnected.

Each one of the intermediate bias plies 18b, 18c is connected with one of the plane bias plies 12b, 12c, wherein the intermediate bias plies 18b, 18c preferably comprise smaller dimensions than the plane bias plies 12b, 12c. By way of example, the intermediate bias ply 18b is connected with the plane bias ply 12b and the intermediate bias ply 18c is connected with the plane bias ply 12c.

It should be noted that additional intermediate bias plies are also illustrated. For instance, an intermediate bias ply 18a is associated with an inner layer arranged—in FIG. 8—above the inner layer 17b, i.e. the inner layer 17a of FIG. 2, and an intermediate bias ply 18d is associated with an inner layer arranged—in FIG. 8—below the inner layer 17b.

FIG. 9 shows representatively for the two outer main plies 10a, 10b of FIG. 2 the outer main ply 10a of the flexbeam element 4 of FIG. 2 having a section IX that is embodied according to an alternative embodiment. In this section IX, the outer main ply 10a illustratively comprises a recess 31, where one or more outer bias plies 32 are arranged on the plane bias ply 12a of the inner layer 17a of FIG. 2. Preferably, the one or more outer bias plies 32 are arranged in a mirroring manner with respect to the curved bias plies 13a, 13b and may have different suitable shapes that allow weakening the section IX in torsion.

FIG. 10 shows representatively for all inner layers of the flexbeam element 4 of FIG. 2 the inner layers 17a, 17b of FIG. 2, which are now embodied according to a sixth variation. As mentioned above with reference to FIG. 3, the curved bias plies 13c, 13d of the inner layer 17b define with the lateral inner main plies 11e, 11g, 11f, 11h of the inner layer 17b the cavities 15c, 15d, which are again circular in cross section. Furthermore, the curved bias plies 13a, 13b of the inner layer 17a define with the lateral inner main plies 11a, 11c, 11b, 11d of the inner layer 17a the cavities 15a, 15b, which are also circular in cross section. Moreover, as described above with reference to FIG. 2, the inner layer 17a further comprises the lateral inner main plies 11a, 11c, 11b, 11d defining the slots 14a, 14b of FIG. 2.

However, in contrast to FIG. 3, the slots 14a, 14b are in parallel offset with a predetermined offset distance 20 between their associated middle axes 19a, 19b. Furthermore, the curved bias plies 13a, 13b are now connected to an additional inner bias ply 33a, which is illustratively S-shaped and arranged in the inner layer 17a, such that it separates the curved bias plies 13a, 13b from each other.

It should be noted that the inner layer 17b is not described in more detail here, but preferably comprises an at least similar structure. In other words, the curved bias plies 13c, 13d of the inner layer 17b are preferably also in parallel offset and separated by an exemplarily S-shaped additional inner bias ply 33b.

FIG. 11 shows a section of the flexbeam element 4 of FIG. 2 in order to illustrate a possible realization in the associated longitudinal direction 4a of FIG. 1.

FIG. 12 shows an alternative flexbeam element 21 that can be used for realization of the multi-blade rotor 1 of FIG. 1 instead of the flexbeam element 4 of FIG. 1 and FIG. 2. The flexbeam element 21 illustratively comprises a cruciform cross section and is preferably embodied with fiber reinforced materials comprising glass fiber reinforced material (GFR) and/or carbon fiber reinforced material (CFR) similar to the flexbeam element 4 of FIG. 1 and FIG. 2.

Illustratively, the flexbeam element 21 comprises a plurality of at least substantially plane outer main plies 21a, 21b, 21c, 21d, 21e, 21f, 21g, 21h that comprise unidirectional fibers, wherein the outer main plies 21a, 21b define a first arm or leg of the flexbeam element 21, the outer main plies 21c, 21d a second arm or leg, the outer main plies 21e, 21f a third arm or leg and the outer main plies 21g, 21h a fourth arm or leg. The unidirectional fibers are preferably at least substantially arranged along an associated longitudinal direction of the flexbeam element 21, e.g. the associated longitudinal direction 4a of FIG. 1.

Between the outer main plies 21a, 21b, 21e, 21f, associated inner curved bias plies are arranged, preferably entirely over a corresponding radial length of the respective outer main plies. These inner curved bias plies exemplarily define associated inner slots. Illustratively, the two outer main plies 21a, 21b encompass an inner curved bias ply 22a, which defines an inner slot 14e, and the two outer main plies 21e, 21f encompass an inner curved bias ply 22b, which defines an inner slot 14g.

The outer main plies 21h, 21c are illustratively connected to each other via an at least substantially plane bias ply 12d, and the outer main plies 21g, 21d are illustratively connected to each other via an at least substantially plane bias ply 12e. The plane bias plies 12d, 12e exemplarily define lateral slots 14f, 14h and encompass at least two comparatively short curved inner bias plies 13e, 13f, which confine the lateral slots 14f, 14h in a central part of the flexbeam element 21. These curved inner bias plies 13e, 13f are preferably interconnected and connected with the plane bias plies 12d, 12e, thereby defining an associated layer cavity 29c that can at least partially be filled with the appropriate fill material 16b of FIG. 2.

Preferably, the at least substantially plane bias plies 12d, 12e are respectively connected with the inner curved bias plies 22a, 22b via outer curved bias plies 23a, 23b, 23c, 23d, thereby defining further layer cavities 29d, 29e. These further layer cavities 29d, 29e can also be filled, at least partially, with an appropriate fill material 16d, 16c, such as short fibers, oriented fibers, resin and/or foam, or even with unidirectional fibers.

It should be noted that all bias plies of the flexbeam element 21 preferably comprise fibers that are oriented transversely relative to the unidirectional fibers of the outer main plies 21a, 21b, 21c, 21d, 21e, 21f, 21g, 21h. More specifically, the fibers of all these bias plies are preferably oriented in an angle of at least approximately ±45° relative to the unidirectional fibers of respectively associated outer main plies 21a, 21b, 21c, 21d, 21e, 21f, 21g, 21h.

FIG. 13 shows a manufacturing component 24, which is suitable for manufacturing the flexbeam element 4 having inner layers according to FIG. 3, FIG. 6, FIG. 7 and FIG. 10. The manufacturing component 24 preferably comprises a plate element 25, in particular a metal plate, having a flexible end 24a that is circular in cross section. The flexible end 24a is preferably constituted of foam or a comparatively highly elastic material. The flexible end 24a is adapted for introduction of a sufficiently big radius to the inner cavities 15a, 15b, 15c, 15d described above with reference to FIG. 3, FIG. 6, FIG. 7 and FIG. 10 and provides for a manufacturing solution for a possible undercut due to an even bigger radius.

During manufacturing of the flexbeam element 4 with inner layers according to FIG. 3, FIG. 6, FIG. 7 and FIG. 10, respective main and bias plies are molded on a given number of manufacturing components 24. It should be noted that the thicknesses of the plate elements 25 of these manufacturing components 24 define the thicknesses of the slots 14a, 14b, 14c, 14d.

After the molding, the manufacturing components 24 are pulled out of the completed flexbeam element 4. Thereby, the flexible ends 24a of these manufacturing components 24 can remain inside the flexbeam element 4, as they are comparatively light weight, or they can be pulled out of the flexbeam element 4 together with the respective plate elements 25.

FIG. 14 shows a manufacturing component 26, which is suitable for manufacturing the flexbeam element 4 having inner layers according to FIG. 4, FIG. 5 and FIG. 8. The manufacturing component 26 comprises, similar to the manufacturing component 24 of FIG. 13, preferably the plate element 25 of FIG. 13. However, in contrast to the manufacturing component 24 of FIG. 13, the plate element 25 is now equipped with a flexible end 26a, which is bulb- or pear-shaped in cross section.

FIG. 15 shows an alternative flexbeam element 34 that can be used for realization of the multi-blade rotor 1 of FIG. 1 instead of the flexbeam element 4 of FIG. 1 and FIG. 2, or instead of the flexbeam element 21 of FIG. 12. The flexbeam element 34 illustratively comprises a double trapezoidal-shaped cross section, which preferably comprises the cross section profile center 4b of the flexbeam element 4 of FIG. 1 and FIG. 2 and which can otherwise be implemented at least similar thereto.

FIG. 16 shows another alternative flexbeam element 35 that can also be used for realization of the multi-blade rotor 1 of FIG. 1 instead of the flexbeam element 4 of FIG. 1 and FIG. 2, the flexbeam element 21 of FIG. 12 or the flexbeam element 34 of FIG. 15. The flexbeam element 35 illustratively comprises a double trapezoidal-shaped cross section with a rectangular center portion, which is preferably embodied by the flexbeam element 4 of FIG. 1 and FIG. 2 with reduced dimensions, and which can otherwise be implemented at least similar thereto.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. In particular, combinations of the above described variations of the inner layers are possible and should, thus, be considered as being covered by the present invention.

REFERENCE LIST 1 multi-blade rotor
2a, 2b, 2c, 2d, 2e rotor blades
3 flexbeam unit
3a, 3b, 3c, 3d, 3e disconnecting points
4 rectangular flexbeam element
4a flexbeam longitudinal direction
4b flexbeam cross section profile center
5 plurality of torsion elements
5a, 5b, 5c, 5d, 5e torsion elements
6 plurality of control cuffs
6a, 6b, 6c, 6d, 6e control cuffs
7 rotor hub
8 rotor shaft
9 rotor head covering cap
10 outer flexbeam layers
10a, 10b outer main plies
11a, 11b, 11c, 11d,
11e, 11f, 11g, 11h inner main plies
12a, 12b, 12c, 12d, 12e inner plane bias plies
13a, 13b, 13c, 13d,
13e, 13f short curved inner bias plies
14a, 14b, 14c, 14d, 14e,
14f, 14g, 14h slots
15a, 15b, 15c, 15d inner cavities
16a, 16b, 16c, 16d fill material
17a, 17b inner flexbeam layers
18a, 18b, 18c, 18d intermediate bias plies
19a, 19b slot middle axis
20 middle axis offset distance
21 cross-shaped flexbeam element
21a, 21b, 21c, 21d, 21e,
21f, 21g, 21h outer main plies
22a, 22b long curved inner bias plies
23a, 23b, 23c, 23d outer curved bias plies
24, 26 manufacturing components
24a circular cavity forming element
25 plate element
26a pear-shaped cavity forming element
27a, 27b curved sections
28a, 28b straight sections
29a, 29b, 29c, 29d, 29e layer cavities
30 slot thickness
31 outer flexbeam layer recess
32 outer bias ply
33a, 33b additional S-shaped inner bias plies
34 double trapezoidal flexbeam element
35 alternative double trapezoidal flexbeam element

What is claimed is:

1. A flexbeam unit for a multi-blade rotor of a rotary wing aircraft, the flexbeam unit comprising a plurality of flexbeam elements defining a predetermined number of torsion elements that are connectable with associated rotor blades of the multi-blade rotor, at least one of the predetermined number of torsion elements comprising at least one flexbeam element having an associated longitudinal direction, the at least one flexbeam element comprising a plurality of inner layers of a first fiber reinforced material that are embedded between at least two outer layers of a second fiber reinforced material, the at least two outer layers being composed of main plies comprising unidirectional fibers and the plurality of inner layers defining a cross section profile center in the associated longitudinal direction of the at least one flexbeam element, the cross section profile center being at least substantially composed of interconnected bias plies comprising fibers that are oriented transversely relative to the unidirectional fibers, wherein at least one of the plurality of inner layers comprises at least two curved bias plies that are embedded between at least two substantially plane bias plies and connected with the plane bias plies, the curved bias plies defining associated cavities and having curved sections, wherein the curved bias plies comprise straight sections extending from the curved sections, and wherein the at least one of the plurality of the inner layers comprises at least four main plies that are arranged in the form of axial extensions of the straight sections of the curved bias plies between the plane bias plies.

2. The flexbeam unit according to claim 1, wherein the first and second fiber reinforced materials comprise glass fiber reinforced material and/or carbon fiber reinforced material.

3. The flexbeam unit according to claim 1, wherein the first and second fiber reinforced materials are identical.

4. The flexbeam unit according to claim 1, wherein the cross section profile center defines a torsion weak and shear force resistant area of the at least one flexbeam element.

5. The flexbeam unit according to claim 1, wherein the interconnected bias plies comprise fibers that are oriented in an angle of about ±45° relative to the unidirectional fibers of the main plies.

6. The flexbeam unit according to claim 5, wherein the unidirectional fibers are at least substantially arranged along the associated longitudinal direction of the at least one flexbeam element.

7. The flexbeam unit according to claim 1, wherein two first main plies of the at least four main plies are associated with the straight sections of a first curved bias ply of the curved bias plies, the two first main plies being separated by a first slot and confining the associated cavity defined by the first curved bias ply.

8. The flexbeam unit according to claim 7, wherein the first slot has a thickness comprised in a range from 0.1 mm to 10 mm.

9. The flexbeam unit according to claim 7, wherein two second main plies of the at least four main plies are associated with the straight sections of a second curved bias ply of the curved bias plies, the two second main plies being separated by a second slot and confining the associated cavity defined by the second curved bias ply, wherein the first and second slots are in parallel offset with a predetermined offset distance.

10. The flexbeam unit according to claim 1, wherein the at least two curved bias plies define with the at least two substantially plane bias plies layer cavities that are filled with associated fill material.

11. The flexbeam unit according to claim 10, wherein the fill material comprises unidirectional fibers, short fibers, oriented fibers, resin and/or foam.

12. The flexbeam unit according to claim 1, wherein the curved bias plies define a U-shaped, bulb-shaped, clip collar-like shaped or circle sector shaped cross section, wherein the straight section of the clip collar-like shaped cross section extends from the curved section along a slot.

13. The flexbeam unit according to claim 1, wherein the curved sections are interconnected.

14. The flexbeam unit according to claim 1, wherein the curved sections are spaced from one another.

15. The flexbeam unit according to claim 1, wherein the at least two curved bias plies are embedded between at least two intermediate, substantially plane bias plies, each of the at least two intermediate bias plies being connected with one of the at least two substantially plane bias plies, wherein the at least two curved bias plies and the at least two intermediate bias plies are embedded between the at least two substantially plane bias plies such that the at least two curved bias plies are connected with the at least two substantially plane bias plies by means of the at least two intermediate bias plies.

16. A flexbeam unit for a multi-blade rotor of a rotary wing aircraft, the flexbeam unit comprising a plurality of flexbeam elements defining a predetermined number of torsion elements that are connectable with associated rotor blades of the multi-blade rotor, at least one of the predetermined number of torsion elements comprising at least one flexbeam element having an associated longitudinal direction, the at least one flexbeam element comprising a plurality of inner layers of a first fiber reinforced material that are embedded between at least two outer layers of a second fiber reinforced material, the at least two outer layers being composed of main plies comprising unidirectional fibers and the plurality of inner layers defining a cross section profile center in the associated longitudinal direction of the at least one flexbeam element, the cross section profile center being at least substantially composed of interconnected bias plies comprising fibers that are oriented transversely relative to the unidirectional fibers, wherein at least one of the plurality of inner layers comprises at least two curved bias plies that are embedded between at least two substantially plane bias plies and connected with the plane bias plies, the curved bias plies defining associated cavities and having curved sections;

wherein the interconnected bias plies comprise fibers that are oriented at an angle relative to the unidirectional fibers of the main plies, and wherein the at least two curved bias plies are embedded between at least two intermediate, substantially plane bias plies, each of the at least two intermediate bias plies being connected with one of the at least two substantially plane bias plies, and wherein the at least two curved bias plies and the at least two intermediate bias plies are embedded between the at least two substantially plane bias plies such that the at least two curved bias plies are connected with the at least two substantially plane bias plies by means of the at least two intermediate bias plies.

17. The flexbeam unit according to claim 16, wherein the unidirectional fibers are at least substantially arranged along the associated longitudinal direction of the at least one flexbeam element.

18. The flexbeam unit according to claim 16, wherein the at least two intermediate bias plies comprise smaller dimensions than the at least two substantially plane bias plies.

19. A flexbeam unit for a multi-blade rotor of a rotary wing aircraft, the flexbeam unit comprising a plurality of flexbeam elements defining a predetermined number of torsion elements that are connectable with associated rotor blades of the multi-blade rotor, at least one of the predetermined number of torsion elements comprising at least one flexbeam element having an associated longitudinal direction, the at least one flexbeam element comprising a plurality of inner layers of a first fiber reinforced material that are embedded between at least two outer layers of a second fiber reinforced material, the at least two outer layers being composed of main plies comprising unidirectional fibers and the plurality of inner layers defining a cross section profile center in the associated longitudinal direction of the at least one flexbeam element, the cross section profile center being at least substantially composed of interconnected bias plies comprising fibers that are oriented transversely relative to the unidirectional fibers, wherein at least one of the plurality of inner layers comprises at least two curved bias plies that are embedded between at least two substantially plane bias plies and connected with the plane bias plies, the curved bias plies defining associated cavities and having curved sections;

wherein the curved bias plies comprise straight sections extending from the curved sections; and wherein the at least one of the plurality of inner layers comprises at least four main plies that are arranged in the form of axial extensions of the straight sections of the curved bias plies between the plane bias plies.

* * * * *